(12) United States Patent
Gonder

(10) Patent No.: US 7,663,328 B2
(45) Date of Patent: Feb. 16, 2010

(54) MULTI-PHASE, MULTI-FREQUENCY CONTROLLER

(75) Inventor: John F. Gonder, Mountlake Terrace, WA (US)

(73) Assignee: The Boeing Company, Chicago, IL (US)

( * ) Notice: Subject to any disclaimer, the term of this patent is extended or adjusted under 35 U.S.C. 154(b) by 281 days.

(21) Appl. No.: 11/955,164

(22) Filed: Dec. 12, 2007

(65) Prior Publication Data

US 2009/0153085 A1 Jun. 18, 2009

(51) Int. Cl.
*H02P 6/08* (2006.01)
(52) U.S. Cl. .................. 318/400.17; 318/105; 318/609
(58) Field of Classification Search ............ 318/400.17, 318/254, 105, 609, 650, 807; 363/42
See application file for complete search history.

(56) References Cited

U.S. PATENT DOCUMENTS

| 5,006,768 | A * | 4/1991 | Rozman ................. 318/400.11 |
| 6,806,662 | B1 | 10/2004 | York |
| 6,807,076 | B1 | 10/2004 | York |
| 7,466,254 | B2 * | 12/2008 | Latham et al. .............. 341/143 |
| 2004/0135533 | A1 * | 7/2004 | Harakawa et al. ........... 318/609 |
| 2005/0077864 | A1 * | 4/2005 | Hsu ........................... 318/812 |
| 2006/0038531 | A1 * | 2/2006 | Wakabayashi et al. ...... 318/807 |
| 2006/0061306 | A1 * | 3/2006 | O'Gorman et al. .......... 318/105 |
| 2007/0182610 | A1 * | 8/2007 | Latham et al. .............. 341/143 |
| 2008/0297095 | A1 * | 12/2008 | Aono et al. ................. 318/650 |
| 2009/0016424 | A1 * | 1/2009 | Latham et al. .............. 375/238 |

* cited by examiner

*Primary Examiner*—Paul Ip
(74) *Attorney, Agent, or Firm*—Rozenblat IP LLC

(57) ABSTRACT

Reference signals are combined with a chop frequency signal in a pulse width modulator (PWM) to provide plural inputs to a multi-phase H-bridge amplifier. Also provided to the bridge amplifier is a high voltage DC input which is converted by the pulsed inputs to the bridge amplifier to a variable AC voltage for driving a motor. The AC drive voltage is also provided to a variable frequency voltage-controlled oscillators (VCOs) in a feedback arrangement, with the variable frequency VCO outputs heterodyned with each of plural outputs of a multi-phase ring oscillator to provide plural baseband signals having a constant phase relationship at a high frequency. The baseband signals form the aforementioned reference signals provided to the PWM in the feedback arrangement with closed loop control and frequency and phase discrimination using phase lock loop techniques for synchronous motor control over a range of DC-100 kHz with 0-25 MHz VCOs.

31 Claims, 3 Drawing Sheets

MULTI-PHASE, MULTI-FREQUENCY CONTROLLER

FIELD OF THE INVENTION

This invention relates generally to a multi-phase, multi-frequency controller employing frequency conversion and feedback control for providing a precisely controlled AC output voltage for driving a device such as an electric motor.

BACKGROUND OF THE INVENTION

Synchronous motors are commonly used in industrial power applications to generate AC power. A synchronous AC induction motor is comprised of a stator and a rotor. The stator assembly is typically comprised of steel laminations shaped to form poles, with copper wires wound around these poles to form primary windings connected to a voltage source for producing a rotating magnetic field. A rotor assembly is typically comprised of laminations formed around a steel shaft core, with radial slots disposed around the laminations' periphery having rotor bars in the form of conductors shorted at the ends disposed parallel to the steel shaft core. Torque within the AC induction motor is developed by the interaction of currents induced in the rotor bars with the rotating magnetic field. Because of its inductive nature, a synchronous motor turning under a load will always turn at a rotational frequency less than that of the rotational frequency of the magnetic field, allowing the rotor bars to cut magnetic lines of force and produce useful torque. In addition, a synchronous motor is not by itself inherently capable of providing variable speed operation, with its speed determined by the frequency of the input power, the nature of the load and the current available. These operating characteristics of a synchronous motor are the result of a phenomenon known as "slip."

With the speed of the synchronous motor determined by, among other things, the frequency of the input power provided to the motor, the output of a pulse width modulator (PWM) is commonly provided to a synchronous motor for providing the motor with a variable output frequency. The width of the pulses is controlled at the input to the synchronous motor and appears as a sinusoidal 3-phase signal. These pulse width modulated signals are typically generated by means of a digital signal processor. This process involves the calculation of the specific pulse width at much faster speeds than the output signal frequency. A large load on these signal processors limits the output frequency of current synchronous motors to on the order of 3 kHz. Employing multiple processors to provide drive signal inputs of increased frequency substantially increases the complexity, particularly of the control software, and the expense of the synchronous motor drive arrangement.

The present invention addresses the aforementioned limitations of the prior art by providing a multi-phase, multi-frequency controller for an AC synchronous motor using heterodyne signal conversion with controlled variable oscillator feedback technology.

SUMMARY OF THE INVENTION

The present invention is directed to a multi-phase, multi-frequency arrangement for controlling an electric motor which utilizes heterodyne conversion of control signals in combination with a voltage controlled oscillator feedback arrangement. A multi-phase ring oscillator generates plural signals having fixed phase relationships at high frequency. These phase-shifted signals are heterodyned down to a baseband frequency signal representing motor speed by means of the output of a voltage controlled oscillator to maintain frequency control as in FM radio tuning and a constant phase relationship among the reference signals. The control reference signals can be varied from DC to 100 kHz using a 0-25 MHz voltage controlled oscillator. Control of the desired baseband frequency is determined by selecting the variable oscillating frequency corresponding to the desired motor speed relative to the 3-phase ring oscillator input. Feedback and closed loop control is provided by frequency and phase discriminators using phase lock loop techniques. The selected frequency of the voltage controlled oscillator is compared with the frequency of the feedback signal for generating an error, or correction, signal frequency which is mixed with fixed phase signals output by the multi-phase ring oscillator to provide the baseband frequency signals representing motor speed correction. This approach provides precise control of the feedback signal and expands the frequency control range far beyond normal analog methods because of the natural noise immunity of the RF-based heterodyne technique. The "lock range" is expanded to very low speeds where sensorless and analog resolver techniques may fail. The control reference signal is provided to a pulse width modulator, the pulsed output of which is provided to a standard multi-phase motor drive amplifier for providing an AC control signal to the motor as well as to the voltage controlled oscillator feedback arrangement. The inventive approach removes pulse width modulation, high speed feedback sensing, and error calculation requirements from a system microprocessor and related interface electronics. This removes various control requirements from the microprocessor which is required only to provide user interface requirements and low speed control and monitoring. By removal of the frequency generation requirements of a motor controller from the microprocessor, less hardware and software are required to control the electric motor. As faster pulse width modulators become available, the baseband frequencies will increase without the requirement to change controllers, since a frequency differential of greater than 100 kHz is easily achievable.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENTS

Figure 1:
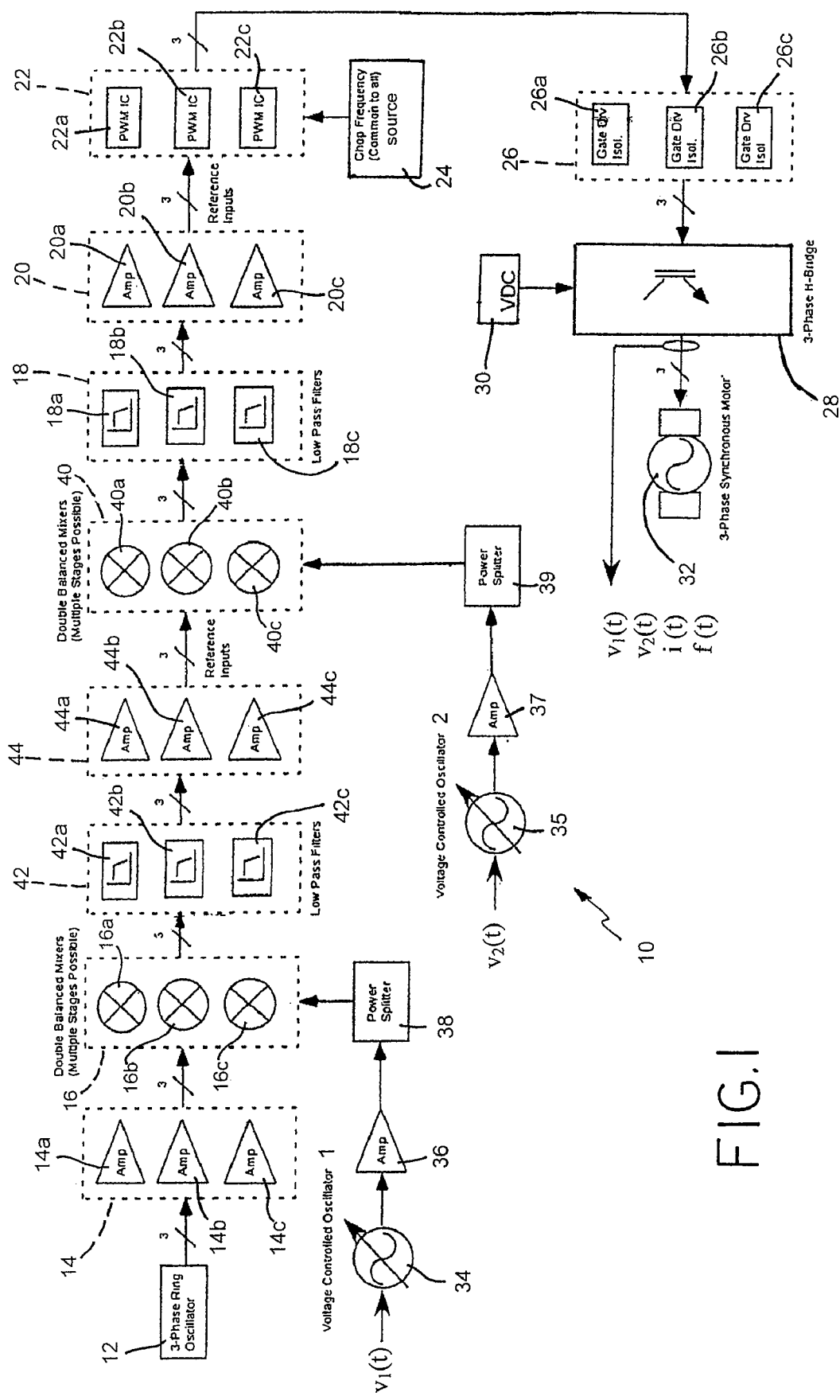
FIG. 1 is a combined schematic and block diagram of a multi-phase, multi-frequency controller for an electric motor in accordance with the present invention.

Referring to FIG. 1, there is shown a combined schematic and block diagram of a multi-phase, multi-frequency controller 10 which is particularly adapted for use with an electric motor 32 in accordance with the present invention.

Multi-phase, multi-frequency controller 10 includes a 3-phase ring oscillator 12 which provides 3 separate output reference signals which are offset in phase from one another by 120°. While described primarily in terms of a 3-phase controller, the present invention is not limited to the use of 3-phase signals, but will operate equally as well with virtually any number of phase offset signals covering the full 360° of motor rotation. Each of the three output reference signals from the 3-phase ring oscillator 12 is provided to one of three respective amplifiers 14a, 14b and 14c in a first amplification stage 14. The amplified output signals from amplifiers 14a, 14b and 14c are each provided to a respective double balanced mixer 16a, 16b and 16c in a first mixer stage 16. Also provided to each of the mixers 16a, 16b and 16c in the first mixer stage 16 is the AC output of a first voltage controlled oscillator (VCO) 34 which is combined with each of the amplified input signals to the three double balanced mixers for providing three heterodyned outputs from the first mixer stage 16. The three outputs from the first mixer stage 16 are each provided to a respective low pass filter 42a, 42b and 42c in a first low pass filter stage 42, which, in turn, provides three low pass filtered output signals to respective amplifiers 44a, 44b and 44c in a second amplification stage 44. The amplified output signals from the second amplification stage 44 are each provided to one of respective double balanced mixers 40a, 40b, and 40c in a second mixer stage 40. An AC output signal from a second voltage controlled oscillator (VCO) 35 is also provided to each of the double balanced mixers 40a, 40b and 40c within the second mixer stage 40 to provide second heterodyned output signals. The reference signals are thus double frequency converted to either a higher or a lower frequency by heterodyning. In a preferred embodiment, the three reference input signals are stepped down to a lower frequency corresponding to the fundamental frequency of electric motor 32 by the first and second mixer stages 16 and 40. The double frequency converted signals are provided to a second low pass filter stage 18 which includes three low pass filters 18a, 18b and 18c. Low pass filters 18a, 18b and 18c are used in processing the reference signals in the preferred embodiment described herein where the reference signals are down-converted by the first and second double balanced mixer stages 16 and 40. The operation of VCO's 34 and 35 in controlling the output signal of the multi-phase, multi-frequency controller 10 provided to electric motor 32 is described in detail below.

The three output reference signals from low pass filters 18a, 18b and 18c are each provided to a respective amplifier 20a, 20b and 20c in a third amplification stage 20 to establish the operating signal level in the multi-phase, multi-frequency controller 10. The amplified reference signals from the three amplifiers 20a, 20b and 20c are each provided to a respective pulse width modulator (PWM) 22a, 22b and 22c within a PWM controller 22. Also provided to the PWM's 22a, 22b and 22c within PWM converter 22 is the output signal from a chop frequency source 24. The chop frequency signal provided to each of the PWM's 22a, 22b and output pulses from the PWM converter 22. The pulse width of each of the outputs from the three PWMs 22a, 22b and 22c is determined by a comparison of the reference input signal frequency with the frequency of the chop signal provided to each of the PWMs. In a preferred embodiment, each pulsed output from the three PWMs 22a, 22b and 22c has a frequency on the order of 250 kHz, with only minute variations in pulse width between the three pulsed outputs. This gives rise to an output signal in the form of a sine wave, which increases in magnitude with increasing pulse width and decreases in magnitude with decreasing pulse width.

The pulsed output reference signals from the three PWMs 22a, 22b and 22c are each provided to a respective gate driver isolation circuit 26a, 26b and 26c within an isolation stage 26. The pulsed output signals from each of the respective gate driver isolation circuits 26a, 26b and 26c are provided to a 3-phase H-bridge amplifier circuit 28. Also provided to the H-bridge amplifier circuit 28 is a high voltage DC signal from a VDC source 30. The pulsed input to the gate driver of the H-bridge amplifier circuit 28 converts the high voltage DC input signal to a time-varying pulse output signal which is provided to a 3-phase synchronous motor 32 in the disclosed embodiment. With the 3-phase synchronous motor 38 having a large inductance, the time-varying square output waves from the H-bridge amplifier circuit 28 appear to the synchronous motor as three oscillating sine waves which drive the motor. The 3-phase synchronous motor 32 filters out some of the square wave characteristics of the output of the H-bridge amplifier circuit 28 by integrating the individual pulses which vary in width over time in smoothing the pulses so that they appear to the motor as a sine wave. The H-bridge circuit 28 operates as a power amplifier which amplifies and modulates the large VDC input to the H-bridge circuit and provides the time-varying, pulsed drive signals to the 3-phase synchronous motor 32.

Figure 2:
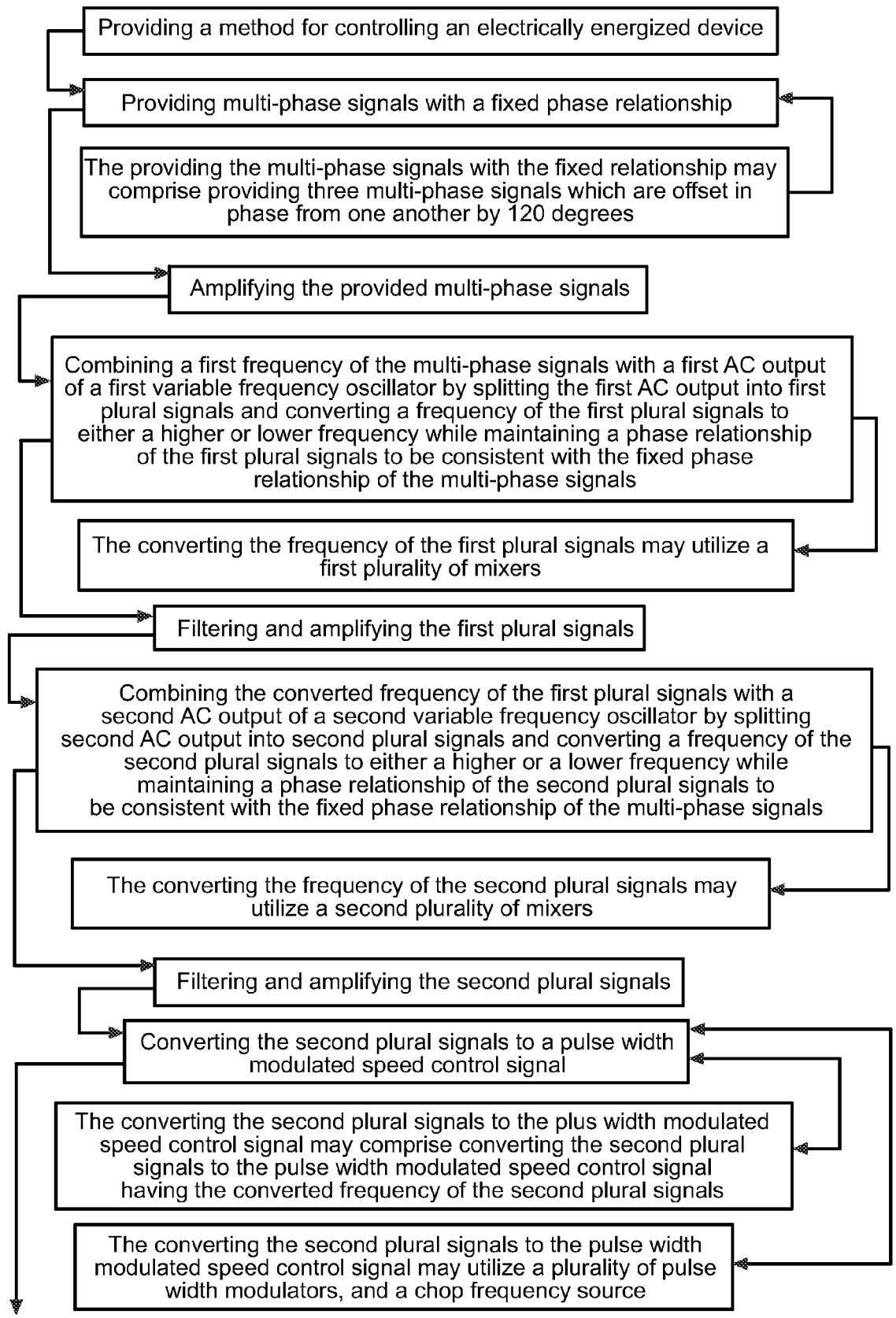
FIG. 2 and FIG. 2A represent a continuous flowchart illustrating one embodiment of a method for controlling an electrically energized device.
Figure 2A:
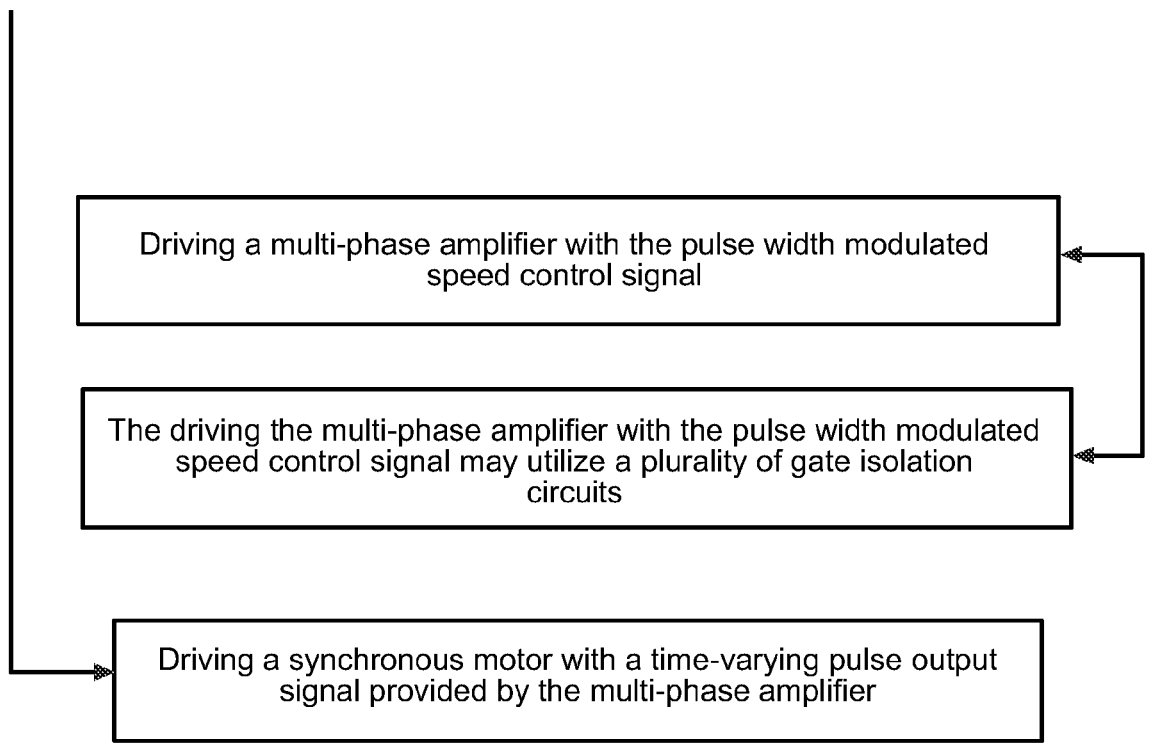

The time-varying, pulsed output of the H-bridge amplifier circuit 28 is also provided as a timed-varying voltage to the first and second VCOs 34 and 35 for comparison with control inputs to each of these VCOs for establishing system frequency and motor operating speed. The feedback control signals $v_1(t)$ and $v_2(t)$ from the H-bridge amplifier circuit 28 to VCOs 34 and 35, respectively, are preferably a 0-5 VDC signal, with the VCO providing an output signal having a frequency in the range 24-29 MHz. The output of VCO 34 is provided to amplifier 36 and then to a power splitter 38 which splits the VCO output into three separate signals, each of which is provided to a respective one of the three double balanced mixers 16a, 16b and 16c in the first mixer stage 16. Similarly, the output of VCO 35 is provided to amplifier 37 and then to a power splitter 39 which splits the VCO output into three separate signals, each of which is provided to a respective one of these double balanced mixers 40a, 40b and 40c in the second mixer stage 40 for again frequency converting the three reference signals. This feedback arrangement provides the input control signal to the 3-phase synchronous motor 32 also to VCOs 34 and 35, the outputs of which are combined with an AC reference input signal for controlling synchronous motor speed. FIG. 2 and FIG. 2A represent a continuous flowchart illustrating one embodiment of a method for controlling an electrically energized device incorporating steps discussed above.

While particular embodiments of the present invention have been described, it will be obvious to those skilled in the relevant arts that changes and modifications may be made without departing from the invention in its broader aspects. For example, while the inventive multi-phase, multi-frequency controller is disclosed in terms of operation with an AC synchronous motor, the inventive controller will operate equally as well driving other types of AC and DC motors as well as any device requiring a multi-phase AC input capable of operating over a wide frequency range. Therefore, the aim in the appended claims is to cover all such changes and modifications that all within the true spirit and scope of the invention. The matters set forth in the foregoing description and accompanying drawings is offered by way of illustration only and not as a limitation. The actual scope of the invention is intended to be defined in the following claims when viewed in their proper perspective based on the prior art.

I claim:

1. A multi-phase, multi-frequency controller for an electric motor comprising:

a multi-phase signal source providing plural first signals having a constant phase relationship, wherein said first signals have a first frequency;

plural mixers coupled to said multi-phase signal source for receiving said first signals and responsive to respective second and third AC signals for combining said first signals and said AC signals to form plural fourth AC signals having a constant phase relationship;

plural modulators coupled to said mixers for converting each of said fourth AC signals to a respective fifth pulsed output signal, wherein the pulse width of each of said fifth pulsed output signals represents the phase of respective sixth sinusoidal signals;

an amplifier coupled to said plural modulators and to a high DC voltage source and responsive to said fifth pulsed output signals for providing a large AC drive signal to the electric motor; and a feedback control arrangement including variable frequency oscillators coupled to said mixers and to said amplifier and responsive to said large AC drive signal for providing said AC drive signal to said mixers for combining said first signals and said AC drive signal in providing said fourth AC signals.

2. The controller of claim 1 wherein said multi-phase signal source is a ring oscillator.

3. The controller of claim 1 further comprising an amplification stage coupled to said multi-phase signal source and to said mixers for providing amplified first signals to said mixers.

4. The controller of claim 1 wherein each of said mixers includes plural, double balanced mixers each adapted to convert a respective first signal to a higher or lower frequency.

5. The controller of claim 4 wherein said first signals are frequency-converted by heterodyning.

6. The controller of claim 5 wherein said plural mixers are connected in series, with each mixer further connected to a respective variable frequency oscillator for multiply converting each of said first signals to a higher or lower frequency.

7. The controller of claim 6 wherein each of said variable frequency oscillators is a voltage controlled oscillator.

8. The controller of claim 1 wherein said first signals are down-converted in frequency by said mixers to said fourth AC signals, and wherein said controller further includes at least one low pass filter stage coupled to said mixers and to said plural modulators for providing low pass filtered fourth AC signals to said modulators.

9. The controller of claim 1 wherein said plural modulators are pulse width modulators each adapted to receive a chop frequency signal for providing said fifth pulsed output signals with a width continuously varying in small increments.

10. The controller of claim 1 wherein said amplifier is a multi-phase, H-bridge circuit.

11. The controller of claim 10 wherein said H-bridge circuit includes plural transistor gates and said controller further comprises plural gate driver isolation circuits coupled to said plural modulators and to said transistor gates.

12. The controller of claim 1 wherein said motor is a multi-phase synchronous motor.

13. Apparatus for controlling an electrically energized device, said apparatus comprising:

a multi-phase AC signal source providing plural first signals having a fixed phase relationship;

a variable frequency signal source for comparing an input control signal and a device speed signal and providing a correction signal representing a difference between a selected speed and the actual speed of the device;

a mixer for combining said first signals with said correction signal and providing an AC speed control signal;

a modulator for converting the AC speed control signal to a pulse width modulated speed control signal, wherein the pulse width varies with the phase of the AC speed control signal; and a high voltage amplifier coupled to said modulator and responsive to said pulse width modulated speed control signal for providing a frequency control signal representing the desired speed of the device to the electrically energized device for controlling the speed of operation of said device and for further providing said frequency control signal to said variable frequency signal source for comparison with the selected speed for generation of said correction signal.

14. The apparatus of claim 13 wherein said electrically energized device is an electric motor.

15. The apparatus of claim 14 wherein said electric motor is a synchronous AC motor.

16. The apparatus of claim 15 wherein said electric motor is a 3-phase synchronous AC motor.

17. The apparatus of claim 13 wherein said frequency is variable from 0-100 kHz.

18. The apparatus of claim 13 wherein said variable frequency signal source is at least one voltage controlled oscillator receiving said input control signal.

19. The apparatus of claim 18 wherein said mixer is at least one heterodyne stage for up-or-down converting said first signals in frequency.

20. The apparatus of claim 19 wherein said correction signal has a frequency equal to the fundamental operating frequency of the electrically energized device.

21. The apparatus of claim 13 further comprising a high voltage DC source coupled to said high voltage amplifier for providing a high voltage AC signal to the electrically energized device.

22. The apparatus of claim 21 wherein said high voltage amplifier is a multi-phase H-bridge.

23. A method for controlling an electrically energized device comprising:

providing multi-phase signals with a fixed phase relationship;

combining a first frequency of the multi-phase signals with a first AC output of a first variable frequency oscillator by splitting the first AC output into first plural signals and converting a frequency of the first plural signals to either a higher or lower frequency while maintaining a phase relationship of the first plural signals to be consistent with the fixed phase relationship of the multi-phase signals;

combining the converted frequency of the first plural signals with a second AC output of a second variable frequency oscillator by splitting the second AC output into second plural signals and converting a frequency of the second plural signals to either a higher or a lower frequency while maintaining a phase relationship of the second plural signals to be consistent with the fixed phase relationship of the multi-phase signals;

converting the second plural signals to a pulse width modulated speed control signal; and driving a multi-phase amplifier with the pulse width modulated speed control signal.

24. The method of claim 23 wherein the providing the multi-phase signals with the fixed phase relationship comprises providing three multi-phase signals which are offset in phase from one another by 120 degrees.

25. The method of claim 23 further comprising amplifying the provided multi-phase signals.

26. The method of claim 23 wherein the converting the frequency of the first plural signals utilizes a first plurality of mixers and the converting the frequency of the second plural signals utilizes a second plurality of mixers.

27. The method of claim 23 further comprising filtering and amplifying the first plural signals and the second plural signals.

28. The method of claim 23 wherein the converting the second plural signals to the pulse width modulated speed control signal comprises converting the second plural signals to the pulse width modulated speed control signal having the converted frequency of the second plural signals.

29. The method of claim 23 wherein the converting the second plural signals to the pulse width modulated speed control signal utilizes a plurality of pulse width modulators, and a chop frequency source.

30. The method of claim 23 wherein the driving the multi-phase amplifier with the pulse width modulated speed control signal utilizes a plurality of gate isolation circuits.

31. The method of claim 23 further comprising driving a synchronous motor with a time-varying pulse output signal provided by the multi-phase amplifier.

* * * * *